(12) United States Patent
Chen

(10) Patent No.: US 7,864,513 B2
(45) Date of Patent: Jan. 4, 2011

(54) KEYPAD MODULE FOR MOBILE ELECTRONIC DEVICE

(75) Inventor: Ming-Pin Chen, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 69 days.

(21) Appl. No.: 12/482,063

(22) Filed: Jun. 10, 2009

(65) Prior Publication Data

US 2010/0226084 A1  Sep. 9, 2010

(30) Foreign Application Priority Data

Mar. 6, 2009  (CN)  .................. 2009 2 0301126

(51) Int. Cl.
*G06F 1/16* (2006.01)

(52) U.S. Cl. ..................... 361/679.08; 379/433.01; 455/557; 174/254; 200/512

(58) Field of Classification Search ............... 400/472, 400/490; 200/345, 512, 310, 406, 5 A, 292, 200/329; 174/260, 250, 254, 50; 345/157, 345/170, 168, 163; 340/815.69, 10.1, 438, 340/425.5; 455/550, 575.4, 557, 90.3, 572; 379/433.01, 159, 428.2; 361/679.56, 679.2, 361/679.08, 679.36, 679.02, 679.33, 679.09, 361/679.34, 679.52, 679.55, 679.57
See application file for complete search history.

(56) References Cited

U.S. PATENT DOCUMENTS

| | | | | |
|---|---|---|---|---|
| 2003/0119543 | A1* | 6/2003 | Kfoury et al. | 455/550 |
| 2008/0037770 | A1* | 2/2008 | Emmert | 379/433.01 |
| 2010/0225499 | A1* | 9/2010 | Peh et al. | 340/815.69 |

* cited by examiner

*Primary Examiner*—Hung V Duong
(74) *Attorney, Agent, or Firm*—D. Austin Bonderer

(57) ABSTRACT

A keypad module for a mobile electronic device is provided. The mobile electronic device has a main body. The keypad module includes a receiving bracket adapted to be mounted on the main body. A flexible circuit board is arranged in the receiving bracket. A switching sheet is located above the flexible circuit board, and capable of actuating the flexible circuit board to produce electrical signal. A rubber sheet is disposed on the switching sheet, and shielding cover sits on the rubber sheet. Wherein the shielding cover is secured to receiving bracket. The shielding cover and the receiving bracket cooperatively define a receiving housing to accommodate the flexible circuit, the switching sheet, and the rubber sheet.

19 Claims, 6 Drawing Sheets

KEYPAD MODULE FOR MOBILE ELECTRONIC DEVICE

BACKGROUND

1. Technical Field

The present disclosure relates to keypad modules, and particularly, to a keypad module for a mobile electronic device.

2. Description of Related Art

A keypad module is a necessary component for a mobile electronic device to provide an input function. Generally, a keypad module includes a plurality of buttons, a dome switch to be pushed down by the button when the button is depressed, thereby to electrically activate a circuit board to produce electrical signal corresponding to the button function. There are some splits or gaps defined by the buttons, dome switch, and the flexible circuit board. If the keypad module cannot be concealed well, light emitted from a light source mounted in the keypad module will be leaked from the splits or gaps in the keypad module.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
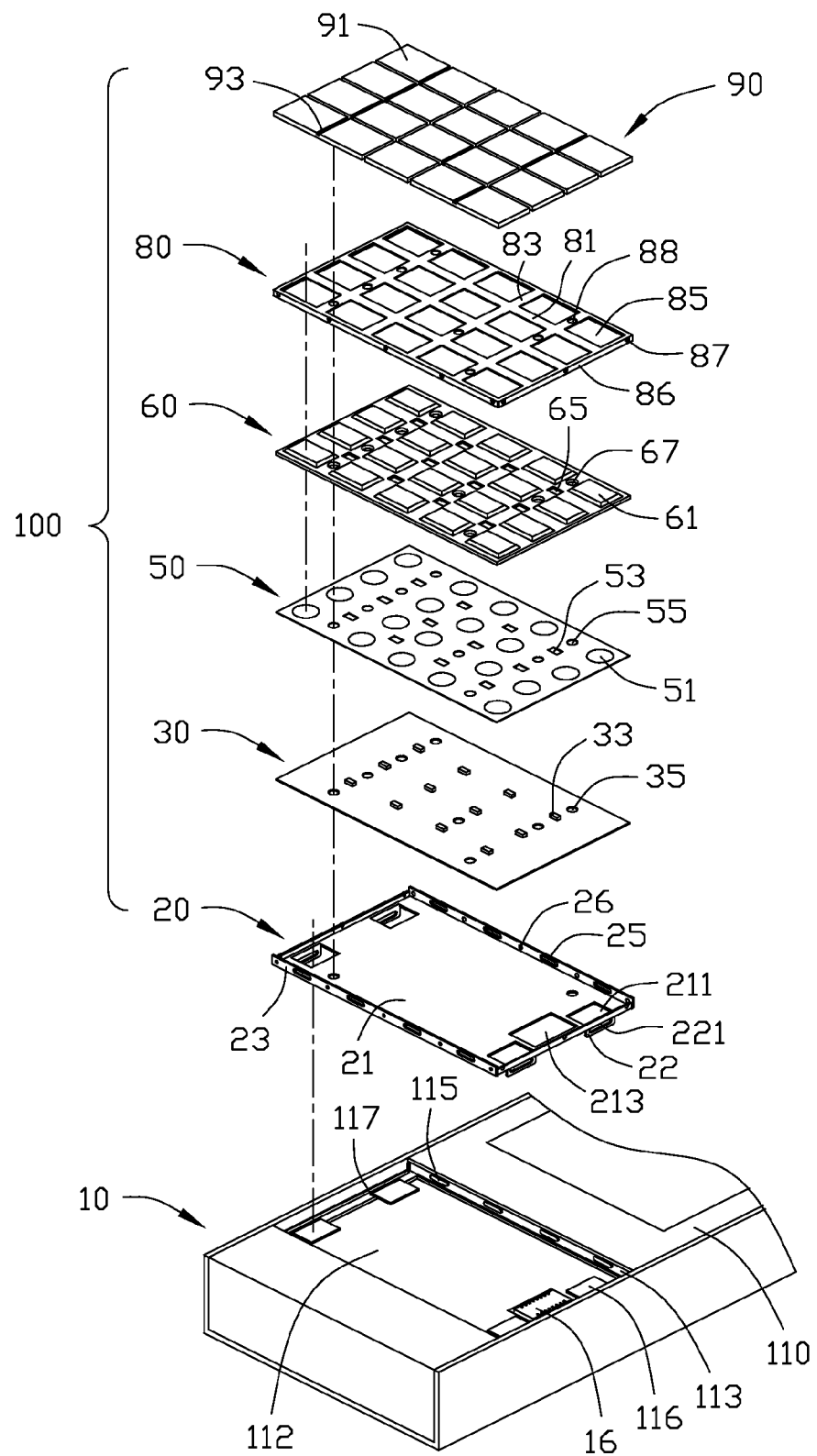
FIG. 1 is an exploded, isometric view of one embodiment of a mobile electronic device, including a keypad module and a main body.
Figure 2:
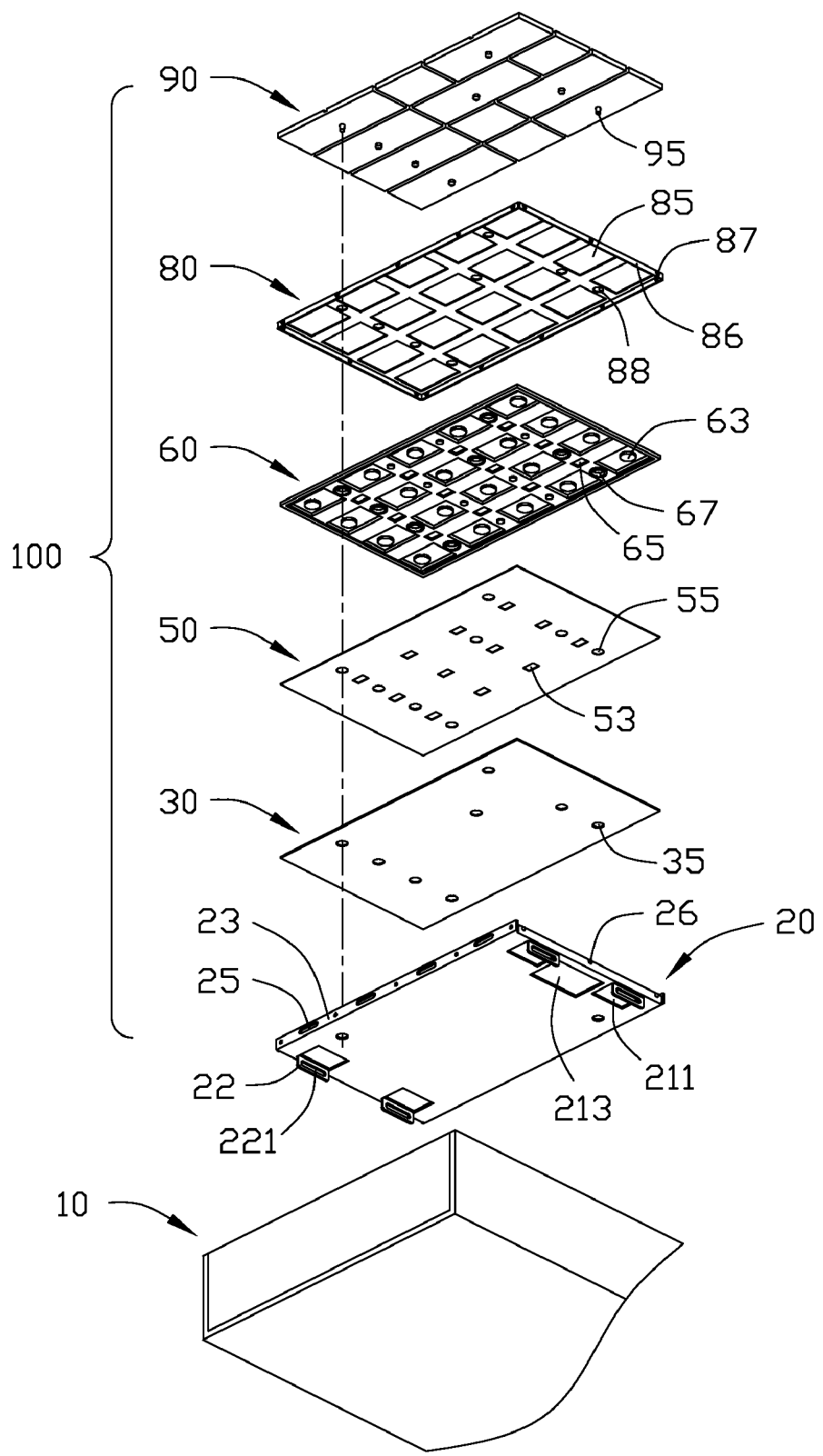
FIG. 2 is similar to FIG. 1, but viewed from another aspect.

Referring to FIGS. 1 and 2, one embodiment of a mobile electronic device includes a main body 10 and a keypad module 100 secured to the main body 10. The keypad module 100 includes a receiving bracket 20 secured to the main body 10, a flexible circuit board (or other circuit board) 30 received in the receiving bracket 20, a switching sheet 50 disposed on the flexible circuit board 30, a rubber sheet 60 configured for covering the switching sheet 50, a shielding cover 80 capable of sitting on the rubber sheet 60, and a button sheet 90 capable of adhering to the rubber sheet 60.

Figure 3:
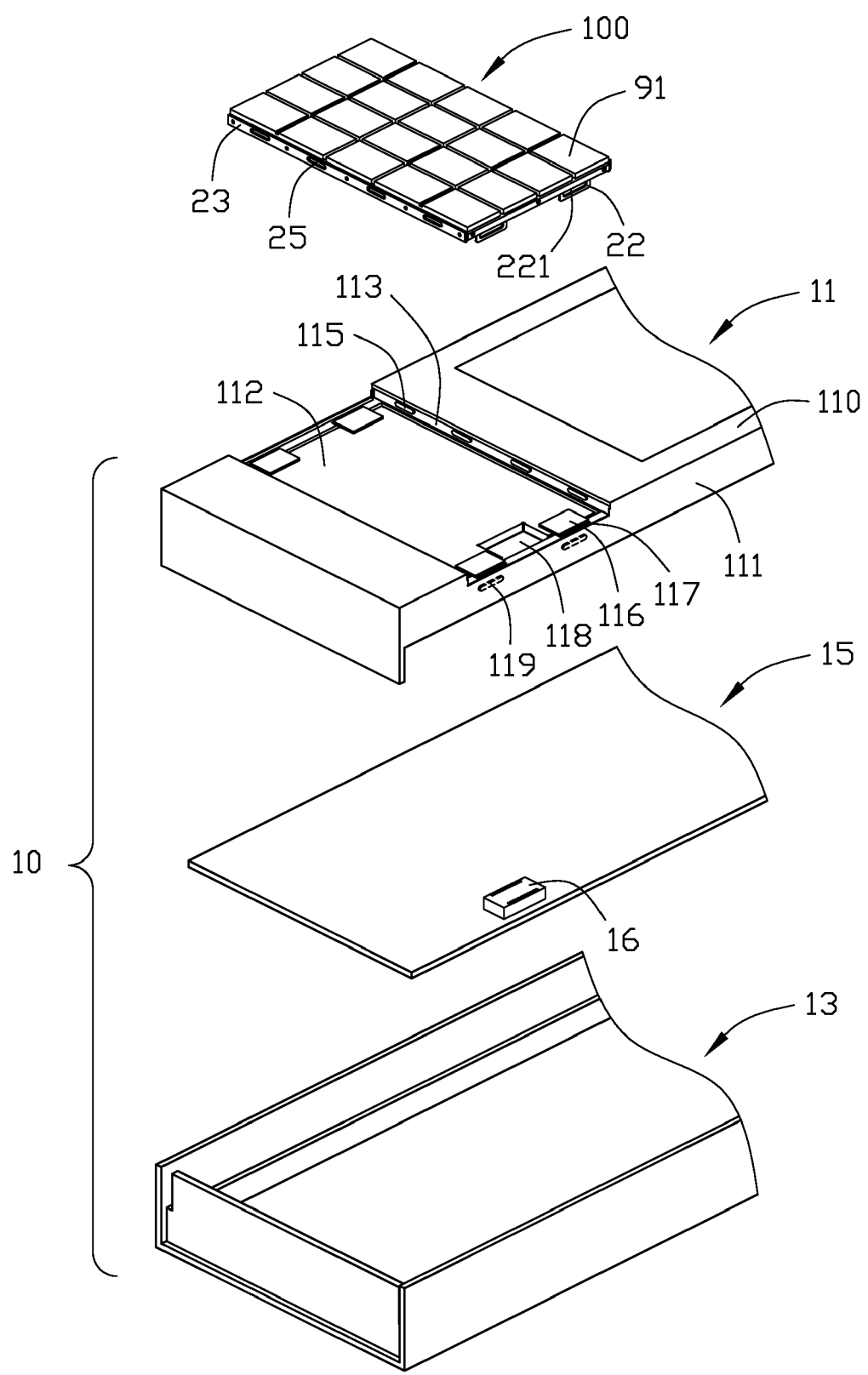
FIG. 3 is an exploded, isometric view of the mobile electronic device, the main body including a panel, a case, and a circuit board.

Referring to FIG. 3, the main body 10 includes a housing 13, a panel 11 configured for covering on the housing 13, and a circuit board 15 accommodated between the panel 11 and the housing 13. A connector 16 is disposed on the circuit board 15 configured to electrically communicate with the flexible circuit board 30.

The panel 11 includes a top wall 110 and two opposite sidewalls 111 perpendicular to the top wall 110. A rectangular recess portion 112 is defined in the top wall 110 and configured to accommodate the keypad module. The recess portion 112 forms two sidewalls 113 connected to the top wall 110. A plurality of first securing protrusions 115 projects from the sidewalls 113. An opening 118 is defined in the recess portion 112 configured to accept the connector 16 therein. Four blocks 116 protrude from opposite sides (two on each side) of the recess portion 112 adjacent to the four corners. A split 117 is defined between each block 116 and the adjacent sidewall 111. Four second securing protrusions 119 project from inner surfaces of the sidewalls 111. The second securing protrusion 119 locates under the split 117.

The receiving bracket 20 includes a rectangular base plate 21 matching the panel recess portion 112. Four flanges 23 generally perpendicularly extend from four edges of the base plate 21. A plurality of first securing slots 25 is defined in two flanges 23 on opposite sides of the receiving bracket 20. The first securing slots 25 are configured for the first securing protrusions 115 engaging therein. A plurality of positioning points 26 protrudes from each flange 23. An opening 213 is defined in the base plate 21 so as to expose the connector 15. Four positioning slots 211 are defined in the base plate 21 corresponding to the blocks 116. Four securing tabs 22 extend downward from opposite sides of the base plate 21. Each securing tab 22 defines a second securing slot 221 configured to receive the second securing protrusion 119.

The flexible circuit board 30 has a configuration fitting the base plate 21 of the receiving bracket 20. A plurality of light sources 33 is disposed on the flexible circuit 30. A plurality of flexible circuit board holes 35 is defined in the flexible circuit 30.

The switching sheet 50 includes a plurality of domes 51. The switching sheet 50 defines a plurality of slots 53 corresponding to the light sources 33 and a plurality of switching sheet holes 55 corresponding to the flexible circuit board holes 35.

The rubber sheet 60 includes a plurality of protruding keys 61 arranged in a manner corresponding to the domes 51. Each protruding keys 61 has a flat top surface. A projection 63 protrudes from a bottom of each protruding key 61, configured to depress the domes 51 on the switching sheet 50 so as to enable the flexible circuit board 30 to produce electrical signals. The rubber sheet 60 defines a plurality of slots 65 corresponding to the light source 33 and a plurality of rubber sheet holes 67 corresponding to the flexible circuit board holes 35.

The shielding cover 80 includes a plurality of transversal bars 81 and a plurality of longitudinal bars 83 perpendicular to the transversal bars 81. The transversal bars 81 and longitudinal bars 83 cooperatively define a plurality of grids 85 configured for receiving the protruding keys 61. A plurality of shielding cover holes 88 is defined in the longitudinal bars 83, corresponding to the flexible circuit board holes 35. The shielding cover 80 further includes four side plates 86 connected one by one to enclose the transversal bars 81 and longitudinal bars 83. A plurality of positioning apertures 87 is defined in the side plates 86 corresponding to the positioning points 26. In an alternative embodiment, the positioning points 26 can be formed on the shielding cover side plates 86, and the positioning apertures 87 can be defined in the receiving bracket flanges 23.

The button sheet 90 includes a plurality of buttons 91 corresponding to the rubber sheet protruding keys 61. Each button 91 has a flat bottom surface. Some buttons 91 are connected at bottom of the buttons 91 to form integral bottom surfaces, and separated from other buttons 91. A notch 93 is defined between adjacent connected buttons 91. A plurality of supporting posts 95 extends down from the integral bottom surfaces where the buttons 91 are jointed. When the keypad module 100 is assembled, the supporting posts 95 abut on the base plate 21 of the receiving bracket 20. When one of the two connected buttons 91 is pressed, the corresponding supporting post 95 functions as a fulcrum to prevent the other of the two buttons 91 accidentally operated.

Figure 4:
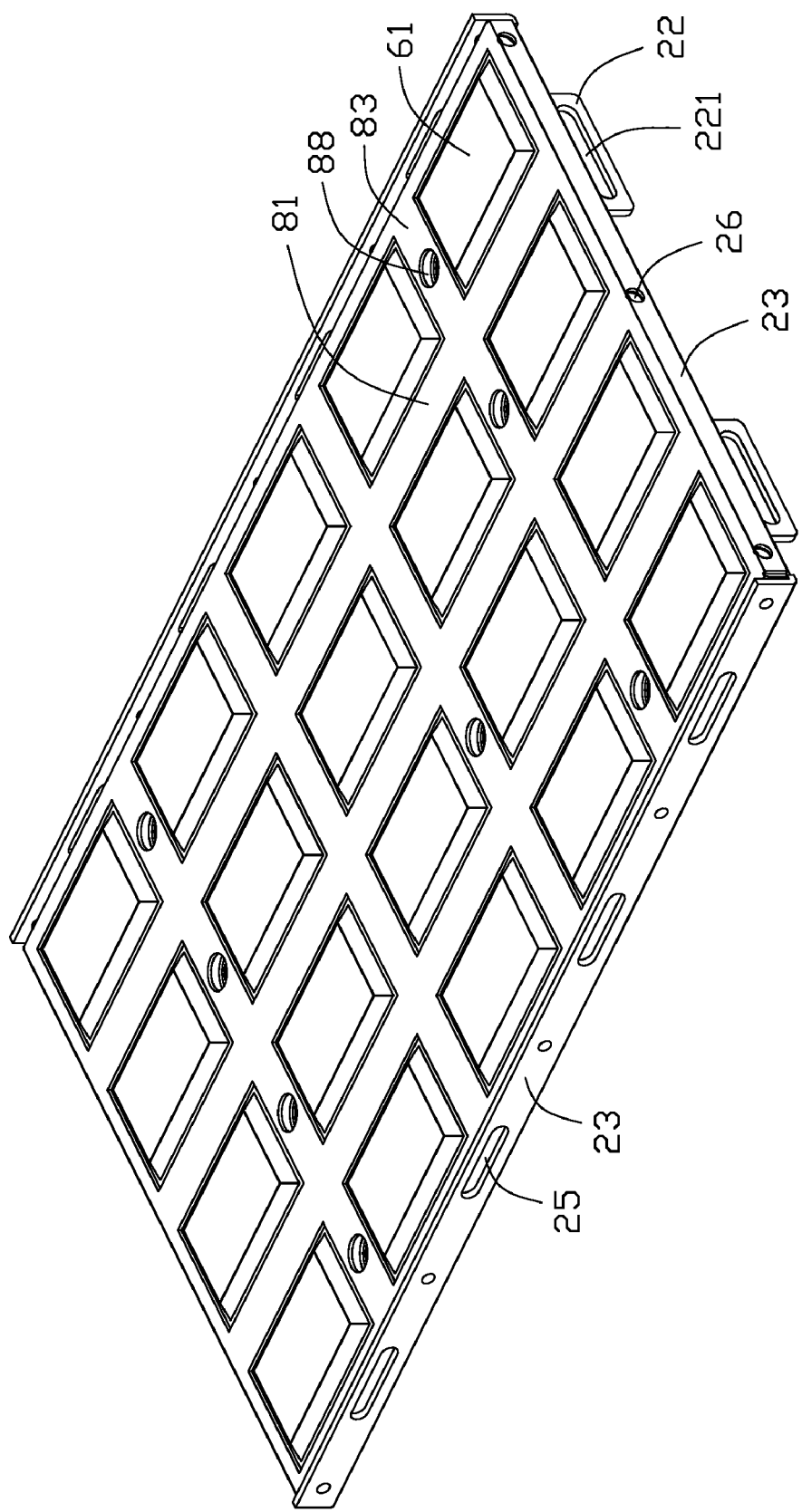
FIG. 4 is an assembled view of a shielding cover, a rubber sheet, a switching sheet, a flexible circuit board, and a receiving bracket of FIG. 1.

Referring to FIG. 4, in assembling the key module 100, the flexible circuit board 30, the switching sheet 50, and the rubber sheet 60 are placed in the receiving bracket 20 in sequence. The light sources 33 extend through the slots 53, 65 in the switching sheet 50 and the rubber sheet 60. The protruding key projections 63 abut the domes 61. The shielding cover 80 sits on the rubber sheet 60. The protruding keys 61 extend out from the shielding cover grids 85. The rubber sheet slots 65 are shielded by the transversal bars 81 and the longitudinal bars 83 to prevent light of the light sources 33 leaking from the slots 65. Two of the side plates 86 on opposite sides of the shielding cover 80 are inserted in the receiving bracket 20 and abut against the inner surfaces of two receiving bracket flanges 23, with the securing slots 25 in the two flanges 23 exposed outside. The other two shielding cover side plates 86 abut against outer surfaces of the other two receiving bracket flanges 23. The flange positioning points 26 engage in the shielding cover positioning apertures 87. Thus, the flexible circuit board 30, the switching sheet 50, and the rubber sheet 60 are retained between the receiving bracket 20 and the shielding cover 80. The edges of the flexible circuit board 30, the switching sheet 50, and the rubber sheet 60 are concealed by the receiving bracket 20 and the shielding cover 80 to prevent light of the light sources 33 leaking from splits or gaps defined by the edges.

Figure 5:
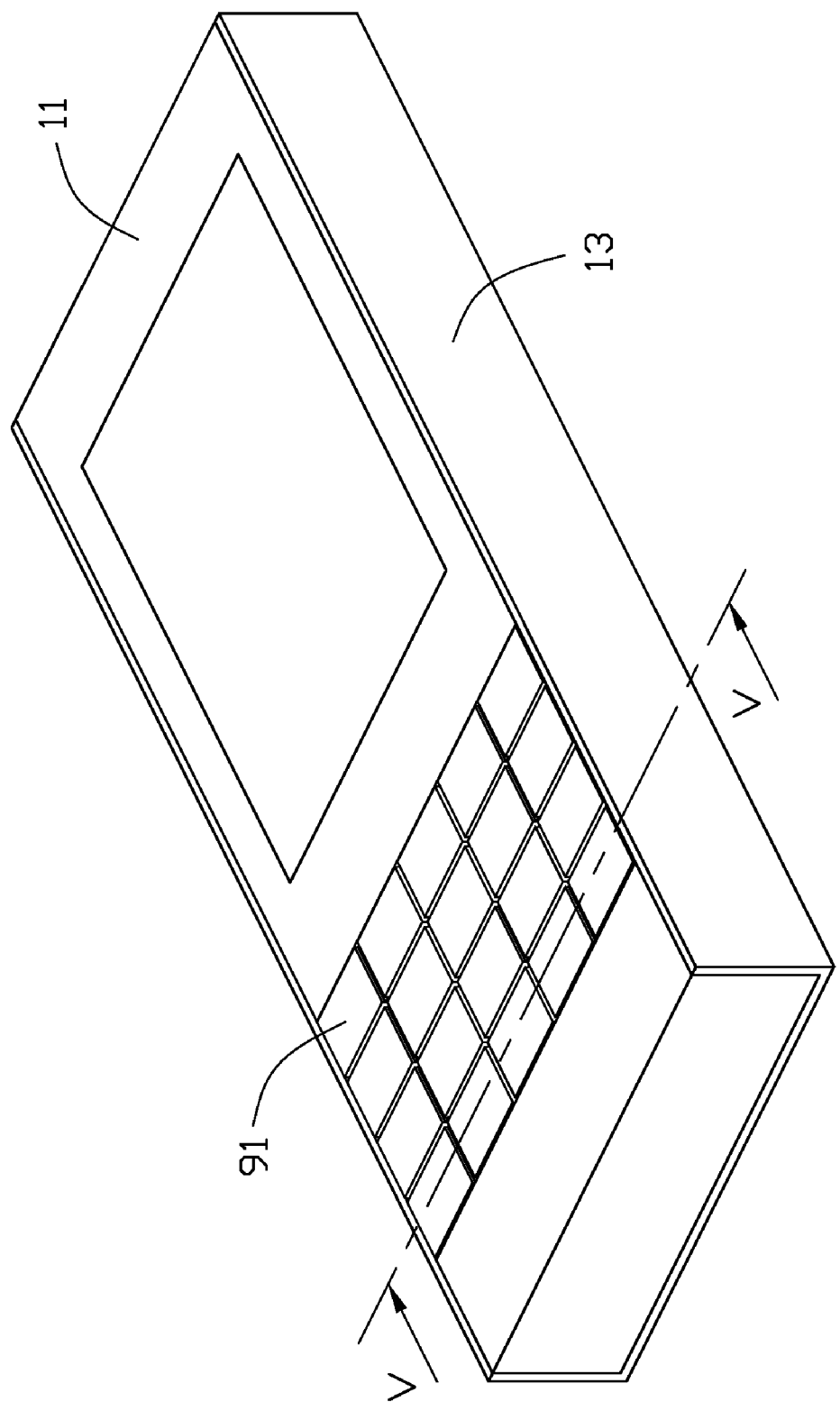
FIG. 5 is an assembled, isometric view of FIG. 1.
Figure 6:
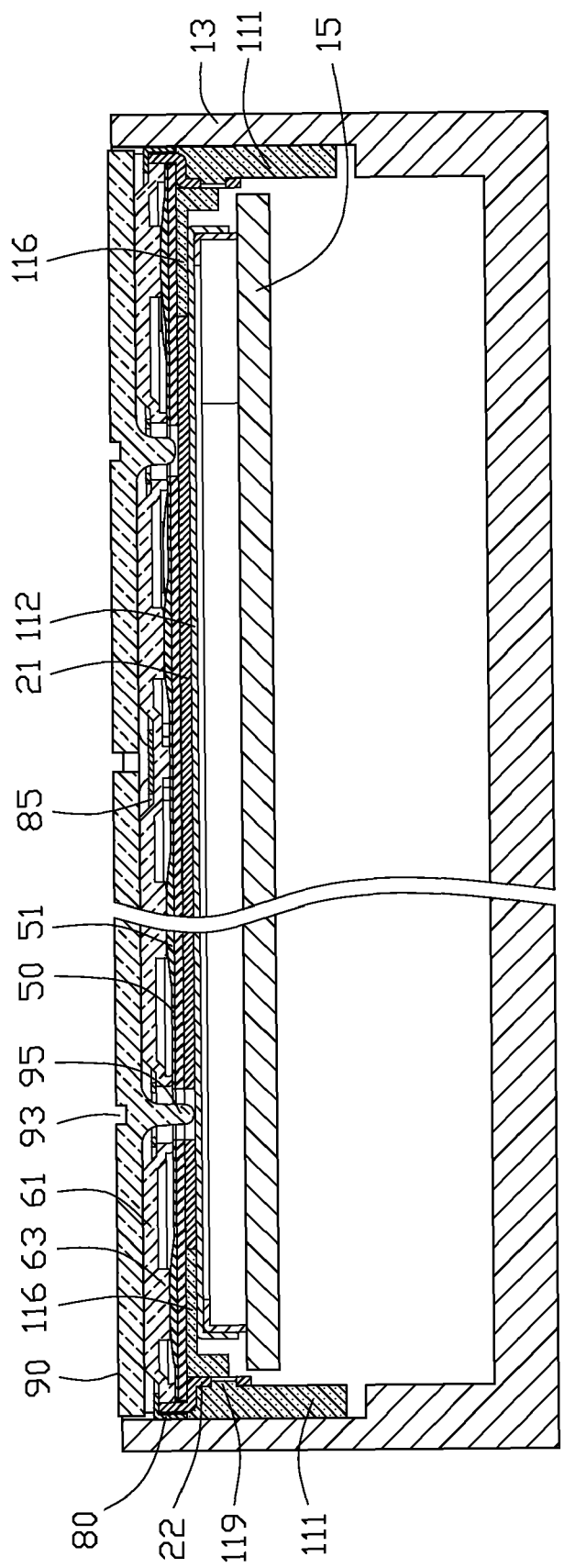
FIG. 6 is a cross-sectional view of V-V in FIG. 5.

Referring to FIGS. 5 and 6, the button sheet 90 abuts on the shielding cover 80. The bottom surfaces of the buttons 91 are adhered to the top surfaces of the corresponding rubber sheet protruding keys 61, with the top surfaces of the protruding keys 61 entirely contacting the bottom surfaces of the buttons 91. The supporting posts 95 extend in the holes 88, 67, 55, and 35. Thus, the button sheet 90, the shielding cover 80, the rubber sheet 60, the switching sheet 50, the flexible circuit board 30, and the receiving bracket 20 cooperatively form the keypad module 100. Then, the key module 100 is accommodated in the main body recess portion 112. The securing tabs 22 are inserted in the panel splits 117, and the second securing protrusions 119 engage with the second securing slots 221 in the securing tabs 22. The first securing protrusions 115 engage with the first securing slots 25 in the receiving bracket sidewalls 23. The main body blocks 116 are received in the receiving bracket positioning slots 211. The connector 16 extends into the receiving bracket opening 213 to electrically connect to the flexible circuit board 30. Thus, the keypad module is secured on the mobile electronic device main body 10.

In use, a button 91 is pressed to depress a rubber sheet protruding key 61. The corresponding dome 51 is pushed down by the rubber sheet protruding key 61. And the flexible circuit board 30 is actuated by the dome 51 to produce a corresponding electrical signal and transfer the signal to the main body circuit board 15 via the connector 16.

It is to be understood, however, that even though numerous characteristics and advantages of the embodiments have been set forth in the foregoing description, together with details of the structure and function of the present disclosure, the disclosure is illustrative only, and changes may be made in detail, especially in matters of shape, size, and arrangement of parts within the principles of the embodiments to the full extent indicated by the broad general meaning of the terms in which the appended claims are expressed.

What is claimed is:

1. A keypad module for a mobile electronic device, the mobile electronic device having a main body, the keypad module comprising:
   a receiving bracket adapted to be mounted on the mobile electronic device main body;
   a circuit board being arranged in the receiving bracket;
   a switching sheet located above the circuit board, and capable of enabling the circuit board to produce electrical signal;
   a rubber sheet disposed on the switching sheet; and
   a shielding cover sitting on the rubber sheet, wherein the shielding cover is secured to the receiving bracket, the shielding cover and the receiving bracket cooperatively define a receiving housing to accommodate the flexible circuit, the switching sheet, and the rubber sheet.

2. The keypad module of claim 1, wherein the key module further comprises a button sheet disposed on the shielding cover, the button sheet comprising a plurality of buttons adhered on the rubber sheet.

3. The keypad module of claim 2, wherein the rubber sheet forms a plurality of protruding keys arranged in an array, the shielding cover defines a plurality of grids corresponding to the protruding keys, the buttons touch the protruding keys through the grids.

4. The keypad module of claim 3, wherein a projection protrudes from a bottom of each protruding key, a plurality of domes is formed on the switching sheet, each dome corresponds to a protruding key so as to be depressed by the protruding key to enable the circuit board.

5. The keypad module of claim 2, wherein each of the buttons has a flat bottom surface, the protruding key corresponding to the button has a flat top surface contacting with the flat bottom surface of the button.

6. The keypad module of claim 5, wherein two of the buttons are connected to form an integral bottom surface, a supporting post protrudes from the integral bottom surface where the two buttons are jointed, and the shielding cover, the rubber sheet, the switching sheet and circuit board each defining a hole for the supporting post extending through.

7. The keypad module of claim 1, wherein a plurality of positioning points protrudes from one of the receiving bracket and the shielding cover, a plurality of positioning apertures is defined in the other of the receiving bracket and the shielding cover, the receiving bracket positioning points protrude into the shielding cover positioning apertures, and the shielding cover positioning points protrude into the receiving bracket positioning apertures.

8. The keypad module of claim 1, wherein the receiving bracket comprises a base plate and four flanges perpendicularly extending from the base plate side edges, the shielding cover comprises four side plates abutting against the receiving bracket flanges to conceal edges of the switching sheet and the circuit board.

9. The keypad module of claim 8, wherein an opening is defined in the receiving bracket base plate configured to receive a connector on the mobile electronic device main body, the circuit board is disposed on the base plate to cover the opening and establish electrical connection with the connector.

10. The keypad module of claim 1, wherein a plurality of light sources is disposed on the circuit board, each of the switching sheet and the rubber sheet defines a plurality of slots for receiving the light source, the shielding cover blocks the slots in the rubber sheet to prevent light emitted by the light source leaking from the slots.

11. A keypad module for a mobile electronic device, the mobile electronic device having a main body, the keypad module comprising:

a receiving bracket adapted to be mounted on the mobile electronic device main body;

a circuit board arranged in the receiving bracket, a plurality of light sources disposed on the circuit board;

a switching sheet disposed on the circuit board capable of actuating the circuit board to produce electrical signal;

a rubber sheet located above the switching sheet and the circuit board capable of applying a depressing force on the switching sheet; wherein the switching sheet and rubber sheet each defines a plurality of slots for the light source extending through; and a shielding cover sitting on the rubber sheet and shielding the slots, edges of the rubber sheet, switching sheet and circuit board being concealed by the shielding cover and the receiving bracket to prevent light emitted by the light source leaking from splits defined by the edges of the rubber sheet, switching sheet and circuit board.

12. The keypad module of claim 11, wherein the rubber sheet forms a plurality of protruding keys arranged in an array, the shielding cover defines a plurality of grids corresponding to the protruding keys, the buttons touch the protruding keys through the grids.

13. The keypad module of claim 12, wherein a projection protrudes from a bottom of each protruding key, a plurality of domes is formed on the switching sheet, each dome corresponds to a protruding key so as to be depressed by the protruding key.

14. The keypad module of claim 11, wherein the key module further comprises a button sheet disposed on the shielding cover, the button sheet comprising a plurality of buttons adhered on the rubber sheet.

15. The keypad module of claim 14, wherein each of the buttons has a flat bottom surface, the protruding key corresponding to the button has a flat top surface contacting with the flat bottom surface of the button.

16. The keypad module of claim 15, wherein two of the buttons are connected to form an integral bottom surface, a supporting post protrudes from the integral bottom surface where the two buttons are jointed, and the shielding cover, the rubber sheet, the switching sheet and circuit board each defining a hole for the supporting post extending through.

17. The keypad module of claim 11, wherein a plurality of positioning points protrudes from one of the receiving bracket and the shielding cover, a plurality of positioning apertures is defined in the other, the receiving bracket positioning points protrude into the shielding cover positioning apertures, and the shielding cover positioning points protrude into the receiving bracket positioning apertures.

18. The keypad module of claim 17, wherein the receiving bracket comprises a base plate and four flanges perpendicularly extending from the base plate side edges, the shielding cover comprises four bent plates abutting against the receiving bracket flanges to conceal the edges of the rubber sheet, switching sheet and circuit board.

19. The keypad module of claim 18, wherein an opening is defined in the receiving bracket base plate configured to receive a connector on the mobile electronic device, the circuit board is disposed on the base plate and covers the opening to establish electrical connection with the connector.

* * * * *